United States Patent
Chen et al.

[19]

[11] Patent Number: 5,879,117
[45] Date of Patent: Mar. 9, 1999

[54] SECURING ASSEMBLY FOR USE WITH A BOLT OR NUT

[76] Inventors: Antony Chen; Han-Wey Chen, both of No. 863, Chienhsing Rd., North Dist., Taichung, Taiwan

[21] Appl. No.: 955,083

[22] Filed: Oct. 21, 1997

[51] Int. Cl.⁶ ..................................................... A47G 3/00
[52] U.S. Cl. .......................... 411/373; 411/372; 411/431; 411/508
[58] Field of Search ................... 411/429–431, 371–377, 411/508, 910, 389

[56] References Cited

U.S. PATENT DOCUMENTS

| | | | |
|---|---|---|---|
| 1,767,184 | 6/1930 | Marabach | 411/375 |
| 1,928,876 | 10/1933 | Bergander | 411/910 |
| 4,601,624 | 7/1986 | Hill | 411/373 |
| 5,480,273 | 1/1996 | Jou | 411/373 |
| 5,651,651 | 7/1997 | Spencer | 411/377 |
| 5,653,564 | 8/1997 | Nakamura | 411/373 |

*Primary Examiner*—Flemming Saether
*Attorney, Agent, or Firm*—Merchant, Gould, Smith, Edell, Welter & Schmidt, P.A.

[57] ABSTRACT

A securing assembly includes a cap having a top with a skirt portion extending laterally from a periphery defining the top, a plurality of passages defined longitudinally in the skirt portion and being accessed from an end edge of the skirt portion, a washer member having a hole and a plurality of engaging members extending laterally from a periphery defining the washer member, and a bolt having a shank thereof extending through the hole with a head thereof being received in the cap. The engaging members are securely received in the corresponding passages. The assembly further includes a second cap with a nut received therein and a second washer member for engagement with the second cap so that the bolt extends through the two washer members and threadedly engages with the nut, wherein the second cap has an aperture defined therethrough so that the shank can extend through the aperture.

5 Claims, 7 Drawing Sheets

SECURING ASSEMBLY FOR USE WITH A BOLT OR NUT

BACKGROUND OF THE INVENTION

1. Field of the Invention

The present invention relates to a securing assembly and, more particularly, to an improved securing assembly for securing a license plate and comprising a bolt, at least one washer and at least one cap which receives a head of the bolt. The washer has a plurality of hook members so as to engage with the cap.

2. Brief Description of the Prior Art

FIG. 8 shows a license plate 60 fixedly disposed to a vehicle (shown in phantom lines) by two bolts 50 cooperated with two washers 52. The two bolts 50 extend through two slots 61 defined in the license plate 60 and threadedly engage with a corresponding member of the vehicle so as to fixedly position the license plate 60. The bolts 50 are easily unscrewed because respective heads of the two bolts 50 are exposed on the vehicle. This shortcoming could encourage thieves to steal license plates 60. Furthermore, the bolts 50 could be come loosened by vibration when the vehicle is driven over an uneven surface.

The present invention intends to provide an improved securing assembly to mitigate and/or obviate the above-mentioned problems.

SUMMARY OF THE INVENTION

The present invention provides a securing assembly which includes a cap having a top with a skirt portion extending laterally from a periphery defining the top, a plurality of passages defined longitudinally in the skirt portion and being accessed from an end edge of the skirt portion, a washer member having a hole and a plurality of engaging members extending laterally from a periphery defining the washer member, and a bolt having a shank thereof extending through the hole with a head thereof being received in the cap. The engaging members are securely received in the corresponding passages.

The assembly further includes a second cap with a nut received therein and a second washer member for engagement with the second cap so that the bolt extends through the two washer members and threadedly engages with the nut, wherein the second cap has an aperture defined therethrough so that the shank can extend through the aperture.

It is an object of the present invention to provide a securing assembly for securely positioning a license plate to a vehicle, wherein a head of a bolt in the assembly is covered by a cap.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
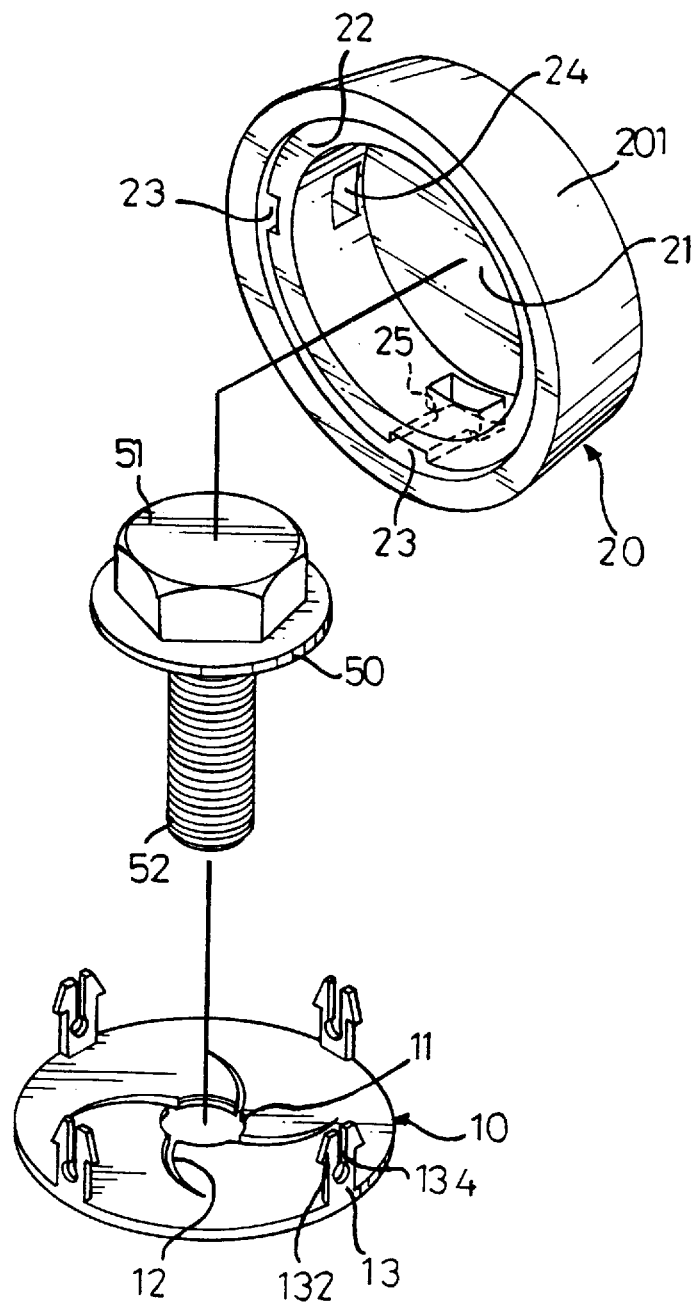
FIG. 1 is an exploded view of a securing assembly in accordance with the present invention.
Figure 2:
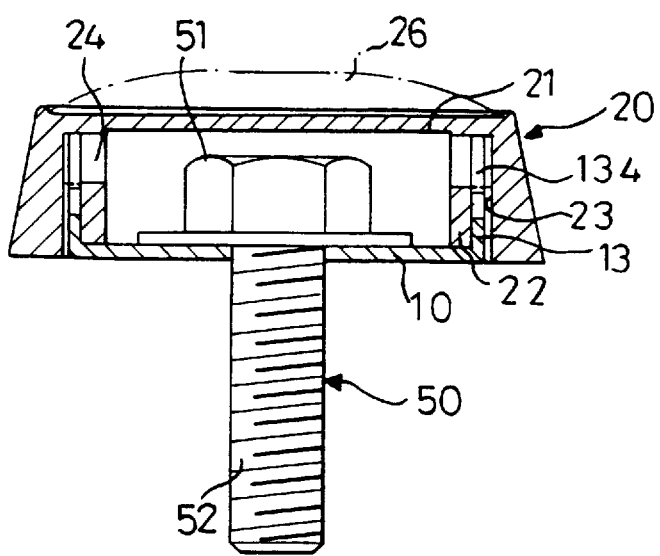
FIG. 2 is a side elevational view, partly in section, of the securing assembly of the present invention.
Figure 3:
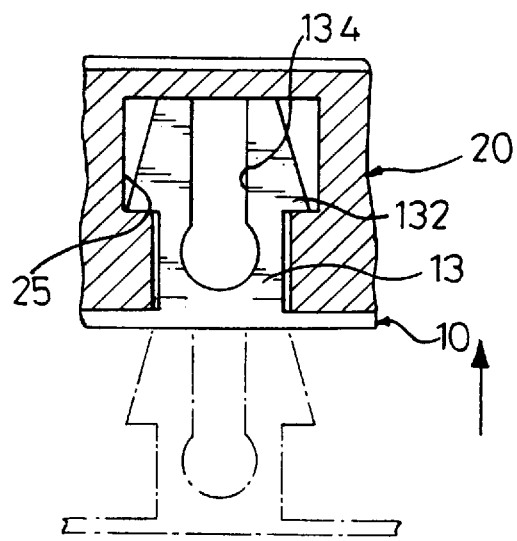
FIG. 3 is a side elevational view, partly in section, to show an engaging member of a washer member received in a passage of a cap.

Referring to the drawings and initially to FIGS. 1 through 3, a securing assembly in accordance with the present invention generally includes a cap 20 having a top 21 and a skirt portion 201 extending laterally from a periphery defining the top 21. An annular shoulder portion 22 is defined in an end edge of the skirt portion 201 and a plurality of passages 23 are defined longitudinally in the skirt portion 201 and accessed from the end edge of the skirt portion 201. Each of the passages 23 has an enlarged inner periphery 25 defined therein which communicates with a mold hole 24 which is defined during a molding process.

A bolt 50 has a head 51 and a shank 52 extending from the head 51, the shank 52 having an outer threaded periphery.

A washer member 10 has a hole 11 defined centrally therethrough and a plurality of engaging members 13 extending laterally from a periphery defining the washer member 10. Each of the engaging members has an arrow-shaped head 132 which has a gap 134 defined centrally therein so that each of the arrow-shaped heads 132 is deformable. A plurality of slits 12 are defined in the washer member 10 and extend radially and outwardly from a periphery defining the hole 11.

Figure 4:
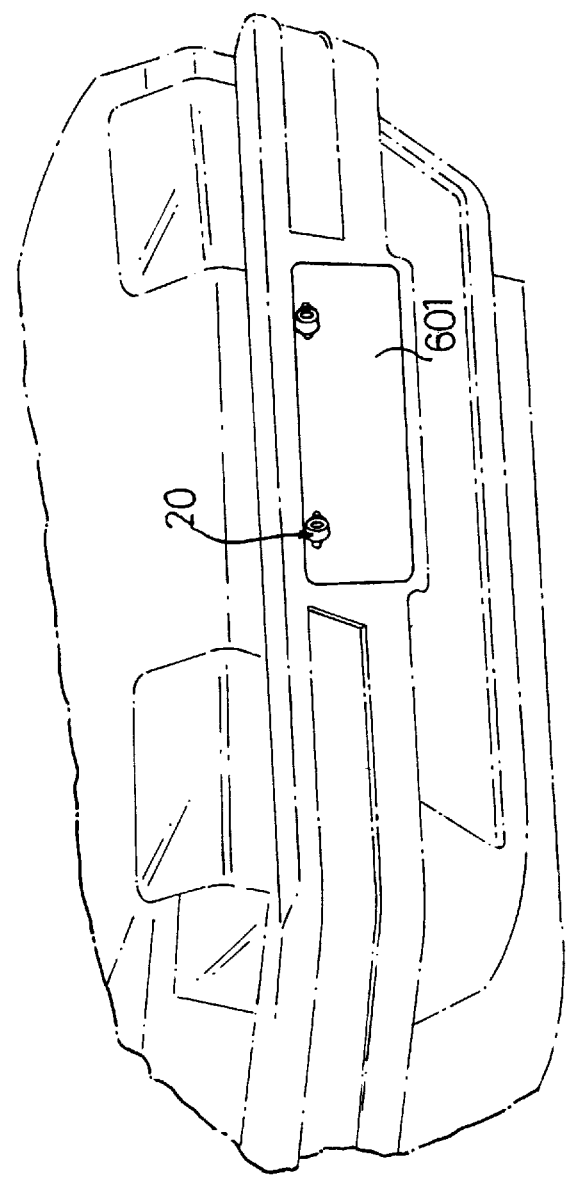
FIG. 4 is a perspective view of a license plate secured on a vehicle by the securing assembly in accordance with the present invention.

When assembling, referring to FIG. 4, the shank 52 extends through the hole 11, a license plate 601 and a part of a vehicle so as to engage with a nut (not shown) disposed on a rear side of the part of the vehicle. The washer member 10 contacts the shoulder portion 22 and the engaging members 13 are securely received in the corresponding passages 23 with the head 51 being received in the cap 20. Therefore, the head 51 of the bolt 50 is covered by the cap 20 so as to prevent access thereto. A reflector 26 (shown in phantom lines in FIG. 2) is disposed to the top 21 of the cap 20 and located on an opposite side of the top 21 corresponding to the skirt portion 201.

Accordingly, the head 51 of the bolt 50 is received and hidden in the cap 20 so that the head 51 is not accessible directly and which will effectively prevent corrosion of the bolt 50.

Figure 5:
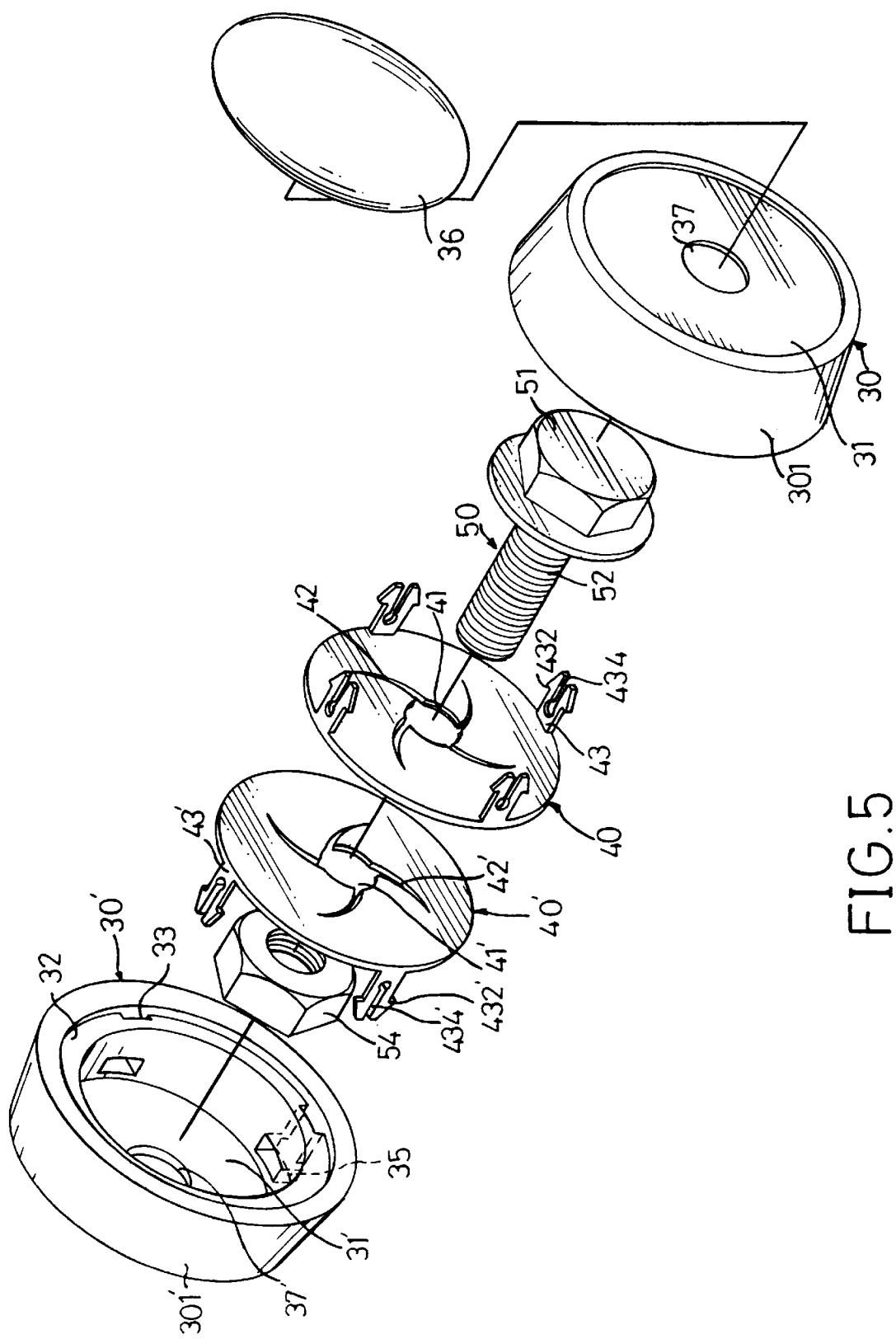
FIG. 5 is an exploded view of a second embodiment of the securing assembly in accordance with the present invention.
Figure 6:
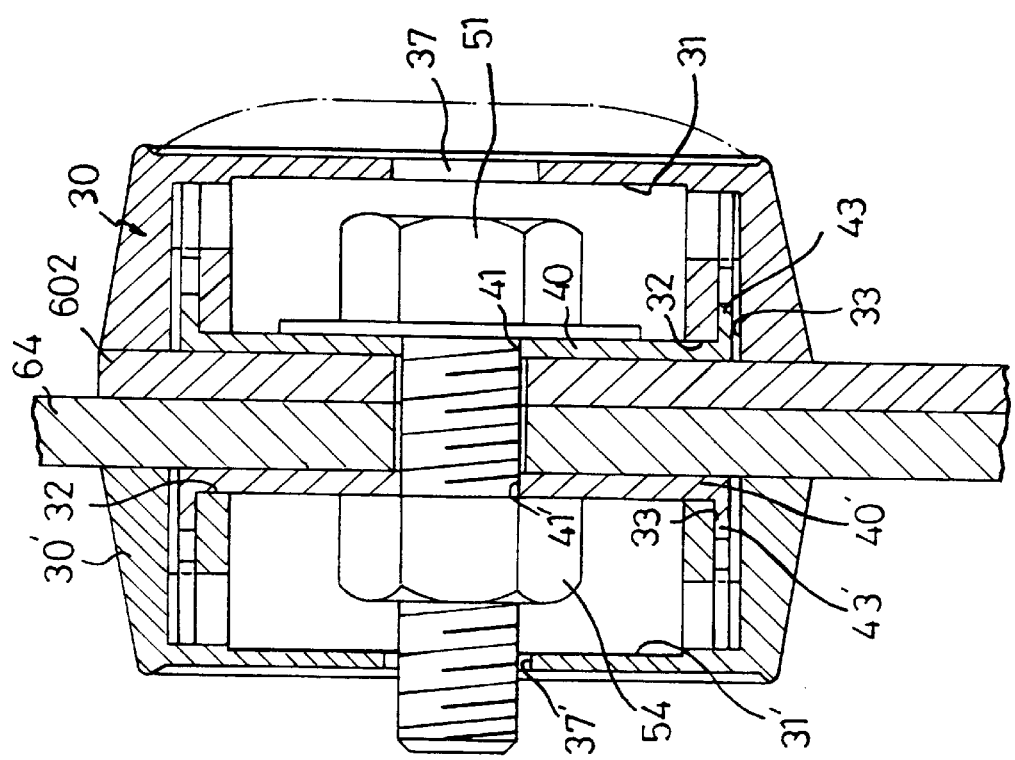
FIG. 6 is a side elevational view, partly in section, of an engagement of the securing assembly of the present invention, the license plate and a part of the vehicle.

FIGS. 5 and 6 show a second embodiment of the securing assembly of the present invention, wherein the assembly includes a first cap 30 and a second cap 30' each having a top 31/31' and a skirt portion 301/301' extending laterally from a periphery defining the top 31/31'. An annular shoulder portion 32 (only that in the second cap is shown) is defined in an end edge of each of the skirt portions 301, 301' and each of the skirt portions 301, 301' has a plurality of passages 33 (only those defined in the second cap are shown) defined longitudinally therein which are accessed from the end edge of the skirt portion 301/301'. Each of the first cap 30 and the second cap 301 has an aperture 37, 37' defined in the top 31/31' thereof. Each of the passages 33 has an enlarged inner periphery 35. The first cap 30 has a reflector 36 disposed to the top 31 thereof.

A bolt 50 has a head 51 and a shank 52 extending from the head 51, the shank 52 having an outer threaded periphery.

Two washer members 40, 40' each have a hole 41/41' defined centrally therethrough and a plurality of engaging members 43/43' extending laterally from a periphery defining the washer member 40/40'. Each of the washer members 40/40' has a plurality of slits 42/42' defined therein and extending radially and outwardly from a periphery defining the hole 41/41'. Each of the engaging members 43/43' has an arrow-shaped head 432/432' so as to be engaged with the enlarged inner periphery 35/35' corresponding thereto, and each of the arrow-shaped heads 432/432' has a gap 434/434' defined centrally therein so that each of the arrow-shaped heads 432/432' are deformable and easily received in the passage 33 corresponding thereto.

Figure 7:
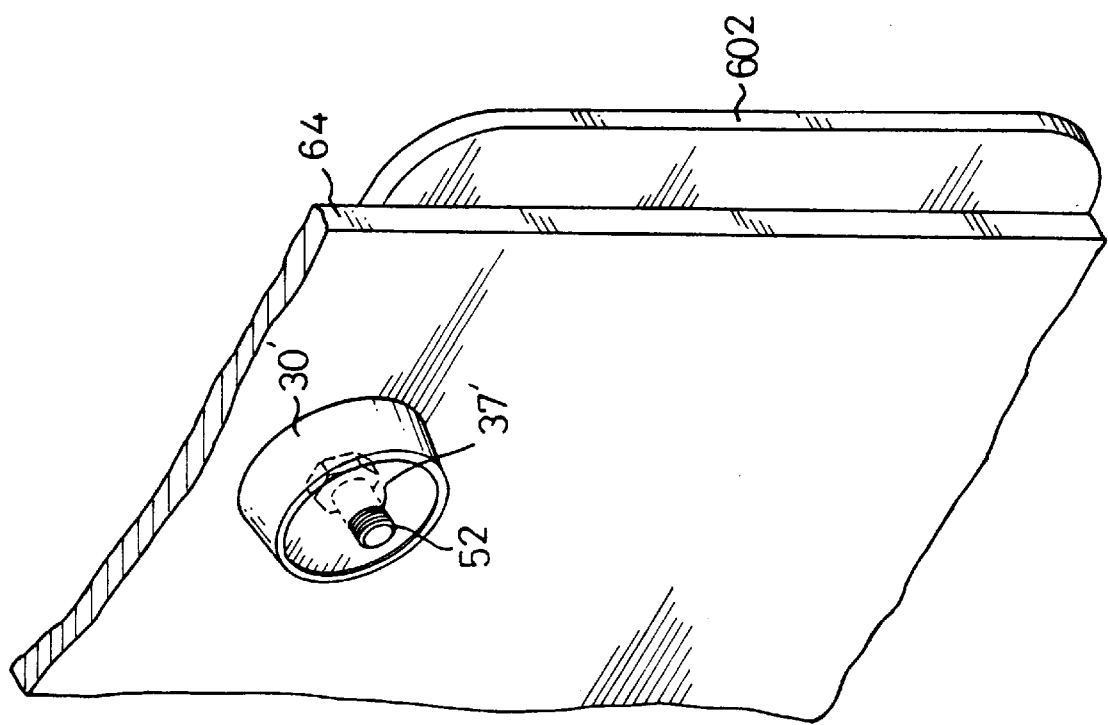
FIG. 7 is a perspective view seen from a rear side of the license plate which is positioned by the securing assembly of the present invention.
Figure 8:
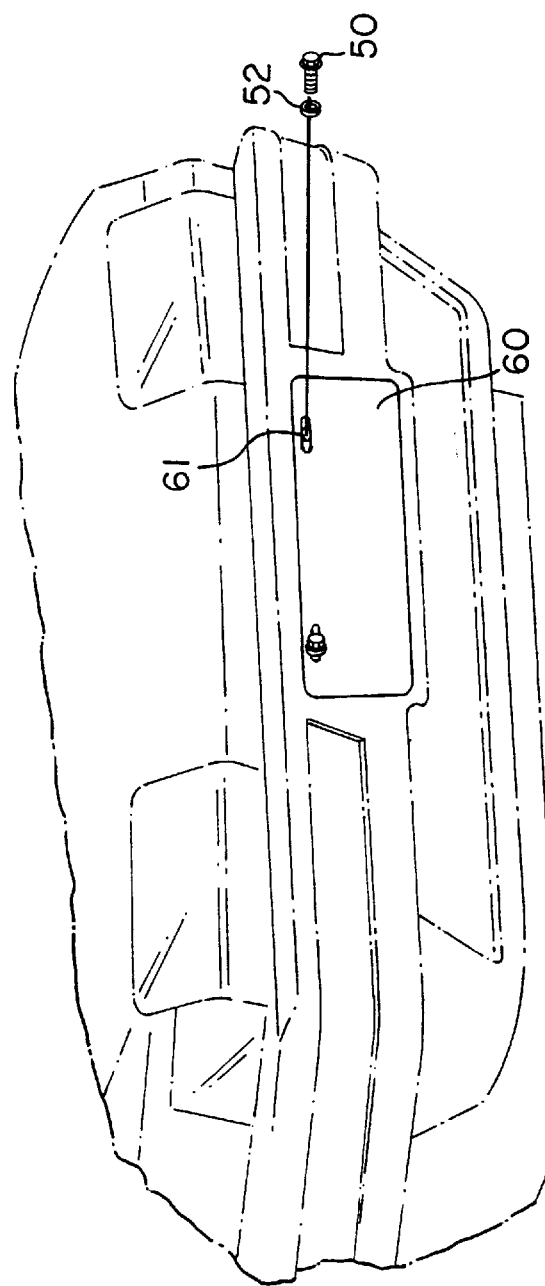
FIG. 8 is an exploded view to show a license plate is positioned on a vehicle by a conventional manner.

When assembling, referring to FIGS. 6 and 7, the two washer members 40, 40' are disposed on a respective side of a comlaned license plate 602 and a part of a vehicle, the shank 52 extends through the two respective holes 41, 41' of the two washer members 40, 40', the license plate 602 and the part 64 of the vehicle, and engage with a nut 54 received in the second cap 30'. The two washer members 40, 40' respectively contact the shoulder portions 32 and are engaged with the first cap 30 and the second cap 30' by securely receiving the engaging members 43, 43' in the passages 33 corresponding thereto with the head 51 being received in the first cap 30.

The aperture 37' of the second cap 30' is sized to allow the shank 52 to extend therethrough so that the bolt 50 having a long shank 52 is also able to be used in the assembly of the present invention.

Although the invention has been explained in relation to its preferred embodiment, it is to be understood that many other possible modifications and variations can be made without departing from the spirit and scope of the invention as hereinafter claimed.

What is claimed is:

1. A securing assembly comprising:
    a cap having a top and a skirt portion extending laterally from a periphery defining said top, a plurality of passages defined longitudinally in said skirt portion and being accessed from an end edge of said skirt portion;
    a bolt having a head and a shank extending from said head, and
    a washer member having a hole defined centrally therethrough and a plurality of engaging members extending laterally from a periphery defining said washer member, each of said engaging members having an arrow-shaped head with a gap defined centrally therein so that each said arrow-shaped head is deformable, each of said passages having an enlarged inner periphery, said shank extending through said hole and said arrow-shaped heads of said engaging members being securely received in said enlarged inner peripheries of said passages in said skirt portion with said head being received in said cap.

2. The securing assembly as claimed in claim 1 wherein said washer member has a plurality of slits defined therein and extending radially and outwardly from a periphery defining said hole.

3. A securing assembly comprising:
    a first cap and a second cap each having a top and a skirt portion extending laterally from a periphery defining said top, each of said skirt portions having a plurality of passages defined longitudinally therein which are accessed from an end edge of said skirt portions, said second cap having an aperture defined in said top thereof;
    a bolt having a head and a shank extending from said head; and
    two washer members each having a hole defined centrally therethrough and a plurality of engaging members extending laterally from a periphery defining said washer members, each of said engaging members having an arrow-shaped head with a gap defined centrally therein so that each said arrow-shaped head is deformable, each of said passages having an enlarged inner periphery, said shank extending through said two respective holes of said two washer members and engaged with a nut received in said second cap, said arrow-shaped heads of said engaging members being securely received in said enlarged inner peripheries of said passages with said head being received in said first cap.

4. The securing assembly as claimed in claim 3 wherein each of said washer members has a plurality of slits defined therein and extending radially and outwardly from a periphery defining said hole.

5. The securing assembly as claimed in claim 3 wherein said aperture is sized to allow said shank to extend therethrough.

* * * * *